(12) United States Patent
Liaghati

(10) Patent No.: US 10,027,964 B2
(45) Date of Patent: Jul. 17, 2018

(54) BI-DIRECTIONAL LOSSLESS ENCODING AND DECODING SYSTEM

(71) Applicant: THE BOEING COMPANY, Chicago, IL (US)

(72) Inventor: Amir L. Liaghati, Huntsville, AL (US)

(73) Assignee: The Boeing Corporation, Chicago, IL (US)

( * ) Notice: Subject to any disclaimer, the term of this patent is extended or adjusted under 35 U.S.C. 154(b) by 229 days.

(21) Appl. No.: 15/171,749

(22) Filed: Jun. 2, 2016

(65) Prior Publication Data

US 2017/0353729 A1     Dec. 7, 2017

(51) Int. Cl.
| | |
|---|---|
| *H04N 19/159* | (2014.01) |
| *H04N 19/13* | (2014.01) |
| *H04N 19/15* | (2014.01) |
| *H04N 19/182* | (2014.01) |

(52) U.S. Cl.
CPC .......... *H04N 19/159* (2014.11); *H04N 19/13* (2014.11); *H04N 19/15* (2014.11); *H04N 19/182* (2014.11)

(58) Field of Classification Search
CPC ...... H04N 19/159; H04N 19/13; H04N 19/15; H04N 19/182
See application file for complete search history.

(56) References Cited

U.S. PATENT DOCUMENTS

2012/0183234 A1* 7/2012 Liu et al. .................... 382/234

* cited by examiner

*Primary Examiner* — Nam Pham
(74) *Attorney, Agent, or Firm* — Apogee Law Group P.C.; Francisco A. Rubio-Campos

(57) ABSTRACT

A bi-directional lossless encoding and decoding ("BLED") system for encoding and decoding an acquired image having M by N pixel values ("P"), the BLED system is disclosed. The BLED system includes an input buffer, a first flipping module, a first encoder, a second encoder, a second flipping module, and a transmit buffer.

20 Claims, 8 Drawing Sheets

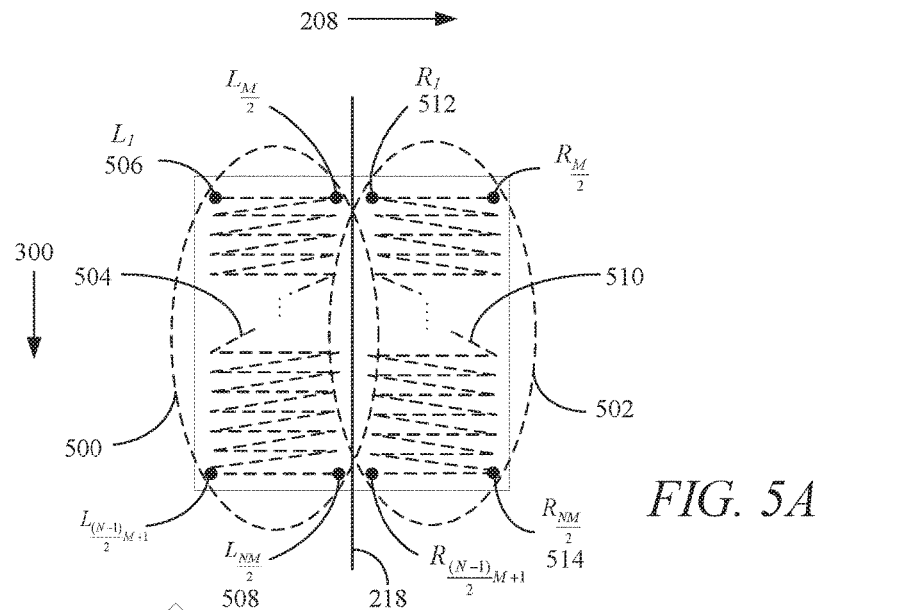
*FIG. 5A*
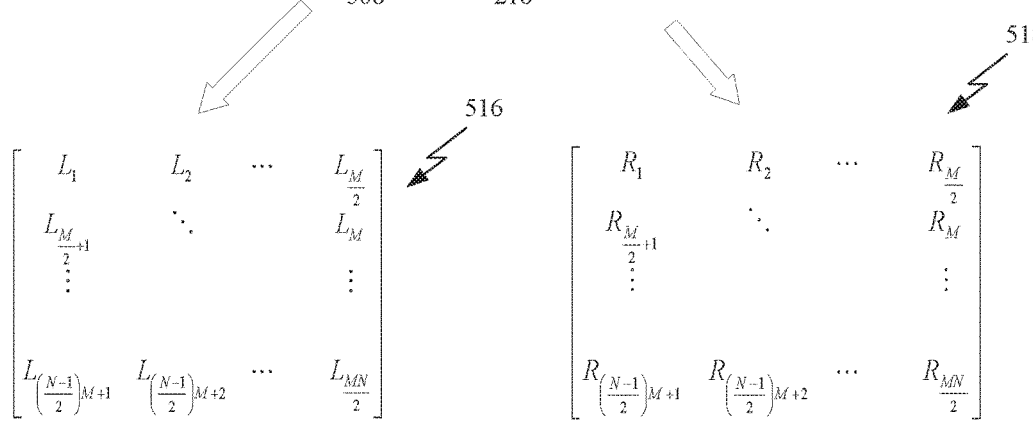
*FIG. 5B*  *FIG. 5C*
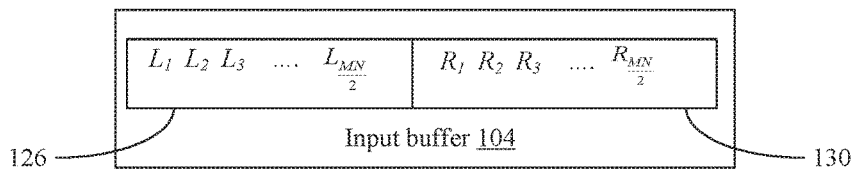
*FIG. 5D*

BI-DIRECTIONAL LOSSLESS ENCODING AND DECODING SYSTEM

BACKGROUND

1. Field

The present disclosure relates to image processing, and more, particularly to parallel processing of images.

2. Related Art

At present, image processing has become commonplace as digital cameras have become common on may devices that range from consumer portable devices (such as, for example, cellular telephones, digital cameras, and personal computing tablets) to industrial, governmental, and military devices. As the size of the captured digital images increase, there is a need to utilize ever more powerful processing devices and processing methods to analyze, process, and/or render these larger digital images.

As the emphasis is given to image process these larger images in shorter amounts of time, modern approaches have included utilizing parallel processing techniques to process these larger captured images. Generally, these images are captured at one location by image capture devices, processed and encoded at that location, and then transmitted to a second location. The transmitted processed image is generally a variable length stream of binary data that is based on the available data captured by the image capture device. This variable length stream of binary data is then transmitted and received by a receiver at the second location. At the second location, the variable length stream of binary data is then decoded to acquire the captured image.

Unfortunately, it is a challenge to decode a variable length stream of binary data using known parallel processing techniques. Generally, these techniques require the utilization of extra bits of data to properly decode these types of variable length streams of binary data. These extra bits are an indicator to determine the last bit of the segment of the image corresponding to the variable length stream of binary data. For the purpose of parallel processing the received variable stream of binary data, the indicator is utilized to determine the last bit of the segment that needs to be sent to a first and subsequent processors of a multi-processor system to properly decode the segments of the image at the same time. Since these approaches require the utilization of indicators to know the end of each block of the image, they also require extra overhead be utilized in the process.

As such, there is a need for a system and method that is capable of processing these captured images without the need for the extra overhead.

SUMMARY

Disclosed is a bi-directional lossless encoding and decoding ("BLED") system for encoding and decoding an acquired image having M by N pixel values ("P"), the BLED system. The BLED system includes an input buffer, a first flipping module, a first encoder, a second encoder, a second flipping module, and a transmit buffer. The input buffer is in signal communication with the first and second encoders and the first flipping module. The second flipping module is in signal communication with both the second encoder and the transmit buffer.

The input buffer includes a first portion of the input buffer and a second portion of the input buffer. The first portion of the input buffer is configured to receive and store a first scanned segment of the acquired image and the second portion of the input buffer is configured to receive and store a second scanned segment of the acquired image. The first scanned segment includes a first sequence of P from a first pixel value ("$P_1$") of the acquired image to an $MN^{th}$ divided by two pixel value $$("P_{\frac{MN}{2}}")$$

and the second scanned segment includes a second sequence of P from an $MN^{th}$ divided by two plus one pixel value $$("P_{\frac{MN}{2}+1}")$$

to an $MN^{th}$ pixel value ("$P_{MN}$"), where the $P_{MN}$ is the last P of the acquired image.

The first flipping module is configured to reverse an order of the second sequence of P to produce a flipped second sequence of P. Then the first encoder is configured to encode the first sequence of P to produce a first encoded sequence and the second encoder is configured to encode the flipped second sequence of P to produce a second encoded sequence. Then the second flipping module is configured to reverse an order of the second encoded sequence to produce a flipped second encoded sequence.

The transmit buffer is in signal communication with the first encoder, the second flipping module, and a transmitter and includes a first portion of the transmit buffer and a second portion of the transmit buffer. The first portion of the transmit buffer is configured to receive and store the first encoded sequence, the second portion of the transmit buffer is configured to receive and store the flipped second encoded sequence, and the transmit buffer is configured to serially feed the transmitter with the first encoded sequence and flipped second encoded sequence as a combined transmit sequence for transmission by the transmitter.

In an example of operation, the BLED performs a method for encoding and decoding an acquired image having M by N pixel values (i.e., P). The method includes receiving the acquired image, partitioning the acquired image into at least two segments, and raster scanning each segment of the at least two segments. The raster scanning produces a first sequence of P from a $P_1$ of the acquired image to an $$P_{\frac{MN}{2}}$$

and a second sequence of P from an $$P_{\frac{MN}{2}+1}$$

to an $P_{MN}$, wherein the $P_{MN}$ is the last P of the acquired image.

The method then saves the first sequence of P as a first segment within a first portion of an input buffer and the second sequence of P as a second segment within a second portion of the input buffer, reverses an order of the second sequence of P within the second segment to produce a flipped second sequence of P with a first flipping module, and encodes the first sequence of P utilizing a first encoder to produce a first encoded sequence and the flipped second sequence of P utilizing a second encoder to produce a second encoded sequence. Moreover, the method then reverses an order of the second encoded sequence to produce a flipped second encoded sequence, stores the first encoded sequence in a first portion of a transmit buffer and the flipped second encoded sequence in a second portion of the transmit buffer, and transmits the first encoded sequence and flipped second encoded sequence as a combined transmit sequence in a serial order with a transmitter.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The present disclosure may be better understood by referring to the following figures. The components in the figures are not necessarily to scale, emphasis instead being placed upon illustrating the principles of the invention. In the figures, like reference numerals designate corresponding parts throughout the different views.

FIG. 5A shows a block diagram of the acquired image shown in FIG. 2A segmented in the horizontal direction as divided by the horizontal half-point dividing axis of the acquire image in accordance with the present disclosure.

FIG. 5B shows a two-dimensional array of pixel values for a first plurality of pixels on the left-hand side shown in the first segmentation of the acquired image in accordance with the present disclosure.

FIG. 5C shows a two-dimensional array of pixel values for a second plurality of pixels on the right-hand side shown in the second segmentation of the acquired image in accordance with the present disclosure.

FIG. 5D shows a block diagram of the input buffer, shown in FIG. 1, including a first scanned segment of a first sequence of pixel values for the left hand side of the acquired pixel and second scanned segment of a second sequence of pixel values for the right hand side of the acquired pixel in accordance with the present disclosure.

DETAILED DESCRIPTION

Figure 1:
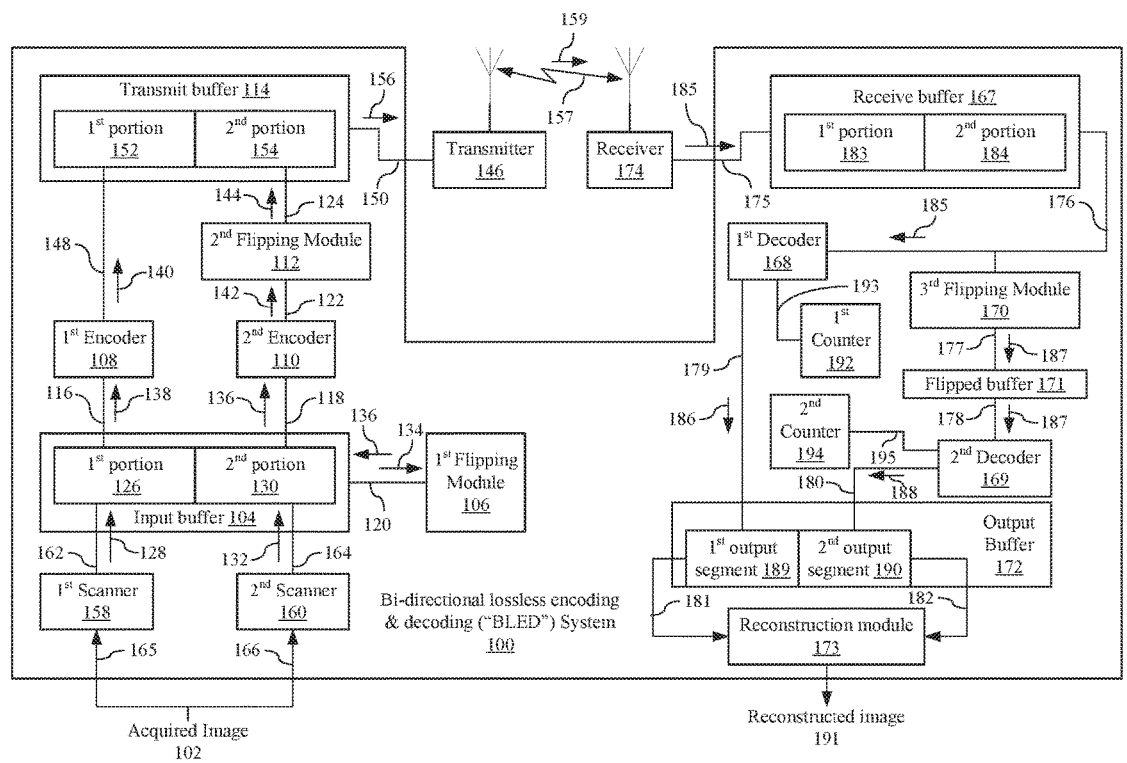
FIG. 1 shows a system block diagram of an example of an implementation of a bi-directional lossless encoding and decoding ("BLED") system in accordance with the present disclosure.

A bi-directional lossless encoding and decoding ("BLED") system for encoding and decoding an acquired image having M by N pixel values ("P"), the BLED system is disclosed. The BLED system includes an input buffer, a first flipping module, a first encoder, a second encoder, a second flipping module, and a transmit buffer. The input buffer is in signal communication with the first and second encoders and the first flipping module. The second flipping module is in signal communication with both the second encoder and the transmit buffer.

The input buffer includes a first portion of the input buffer and a second portion of the input buffer. The first portion of the input buffer is configured to receive and store a first scanned segment of the acquired image and the second portion of the input buffer is configured to receive and store a second scanned segment of the acquired image. The first scanned segment includes a first sequence of P from a first pixel value ("$P_1$") of the acquired image to an $MN^{th}$ divided by two pixel value $$\left( ``P_{\frac{MN}{2}}"\right)$$

and the second scanned segment includes a second sequence of P from an $MN^{th}$ divided by two plus one pixel value $$\left( ``P_{\frac{MN}{2}+1}"\right)$$

to an $MN^{th}$ pixel value ("$P_{MN}$"), where the $P_{MN}$ is the last P of the acquired image.

The first flipping module is configured to reverse an order of the second sequence of P to produce a flipped second sequence of P. Then the first encoder is configured to encode the first sequence of P to produce a first encoded sequence and the second encoder is configured to encode the flipped second sequence of P to produce a second encoded sequence. Then the second flipping module is configured to reverse an order of the second encoded sequence to produce a flipped second encoded sequence.

The transmit buffer is in signal communication with the first encoder, the second flipping module, and a transmitter and includes a first portion of the transmit buffer and a second portion of the transmit buffer. The first portion of the transmit buffer is configured to receive and store the first encoded sequence, the second portion of the transmit buffer is configured to receive and store the flipped second encoded sequence, and the transmit buffer is configured to serially feed the transmitter with the first encoded sequence and flipped second encoded sequence as a combined transmit sequence for transmission by the transmitter.

In general, the BLED system is a system that is configured to perform a bi-directional scheme for lossless encoding and decoding of images in parallel processing applications based on how many processors are utilize by the BLED system. In an example of operation, the BLED system performs a method for encoding and decoding an acquired image having M by N pixel values (i.e., P). The method includes receiving the acquired image, partitioning the acquired image into at least two segments, and raster scanning each segment of the at least two segments. The raster scanning produces a first sequence of P from a $P_1$ of the acquired image to a $$P_{\frac{MN}{2}}$$

and a second sequence of P from a $$P_{\frac{MN}{2}+1}$$

to a $P_{MN}$, wherein the $P_{MN}$ is the last P of the acquired image.

The method then saves the first sequence of P as a first segment within a first portion of an input buffer and the second sequence of P as a second segment within a second portion of the input buffer, reverses the order of the second sequence of P within the second segment to produce a flipped second sequence of P with a first flipping module, and encodes the first sequence of P utilizing a first encoder to produce a first encoded sequence and the flipped second sequence of P utilizing a second encoder to produce a second encoded sequence. Moreover, the method then reverses an order of the second encoded sequence to produce a flipped second encoded sequence, stores the first encoded sequence in a first portion of a transmit buffer and the flipped second encoded sequence in a second portion of the transmit buffer, and transmits the first encoded sequence and flipped second encoded sequence as a combined transmit sequence in a serial order with a transmitter.

In FIG. 1, a system block diagram of an example of an implementation of the BLED system 100 for encoding and decoding an acquired image 102 having M by N pixel values P is shown in accordance with the present disclosure. The BLED system 100 is configured to receive the acquired image 102 and perform a bi-directional scheme for lossless encoding and decoding the acquired image 102 based on how many processors are utilize by the BLED system 100. In this example, the BLED system 100 includes an input buffer 104, a first flipping module 106, a first encoder 108, a second encoder 110, a second flipping module 112, and a transmit buffer 114. The input buffer 104 is in signal communication with the first and second encoders 108 and 110 and the first flipping module 106 via signal paths 116, 118, and 120, respectively. The second flipping module 112 is in signal communication with both the second encoder 110 and the transmit buffer 114 via signal paths 122 and 124, respectively.

The input buffer 104 includes a first portion 126 of the input buffer 104 and a second portion 130 of the input buffer 104. The first portion 126 of the input buffer 104 is configured to receive and store a first scanned segment 128 of the acquired image 102 and the second portion 130 of the input buffer 104 is configured to receive and store a second scanned segment 132 of the acquired image 102. The first scanned segment 128 includes a first sequence of P 138 from a first pixel value $P_1$ of the acquired image 102 to the $$P_{\frac{MN}{2}}$$

and the second scanned segment 132 includes a second sequence of P 134 from an $$P_{\frac{MN}{2}+1}$$

to the $P_{MN}$, where the $P_{MN}$ is the last P of the acquired image 102. The first flipping module 106 is in signal communication with the second portion 130 of the input buffer 104, via signal path 120, and is configured to receive and reverse an order of the second sequence of P 134 to produce a flipped second sequence of P 136 that returns and replaces the second sequence of P 134 within the second portion 130 of the input buffer 104. Then the first encoder 108 is configured to encode the first sequence of P 138 to produce a first encoded sequence 140 and the second encoder 110 is configured to encode the new second sequence of P 136 (which is the flipped second sequence of P 136) to produce a second encoded sequence 142. Then the second flipping module 112 is configured to reverse an order of the second encoded sequence 142 to produce a flipped second encoded sequence 144. The transmit buffer 114 is in signal communication with the first encoder 108, the second flipping module 112, and a transmitter 146 via signal paths 148, 124, and 150, respectively. The transmit buffer 114 includes a first portion 152 of the transmit buffer 114 and a second portion 154 of the transmit buffer 114. The first portion 152 of the transmit buffer 114 is configured to receive and store the first encoded sequence 140, the second portion 154 of the transmit buffer 114 is configured to receive and store the flipped second encoded sequence 144, and the transmit buffer 114 is configured to serially feed the transmitter 146 with the first encoded sequence 140 and flipped second encoded sequence 144 as a combined transmit sequence 156 for transmission by the transmitter 146.

In this example, the BLED system 100 also includes a first scanner 158 and a second scanner 160 in signal communication with the input buffer 104 via signal paths 162 and 164, respectively. The first scanner 158 is configured to raster scan the MN divided by two pixel values of a first segment 165 of the acquired image 102 from $P_1$ to $$\frac{P_{MN}}{2}$$

to produce the first scanned segment 128 and the second scanner 160 is configured to raster scan the MN divided by two pixel values of a second segment 166 of the acquired image 102 from $$P_{\frac{MN}{2}+1}$$

to $P_{MN}$ to produce the second scanned segment 132.

Moreover, in this example, the BLED system 100 also includes a receive buffer 167, a first decoder 168, a second decoder 169, a third flipping module 170, a flipped buffer 171, an output buffer 172, and a reconstruction module 173. The receive buffer 167 is in signal communication with a receiver 174, the first decoder 168, and the third flipping module 170 via signal paths 175 and 176, respectively. The flipped buffer 171 is in signal communication with both the third flipping module 170 and second decoder 169 via signal paths 177 and 178, respectively. As such, it is appreciated by those of ordinary skill in the art that the second decoder 169 is in signal communication with the receive buffer 167 via a signal path that includes signal paths 176, 177, and 178 and a signal path through the third flipping module 170 and flipped buffer 171. The output buffer 172 is in signal communication with the first decoder 168, second decoder 169, and reconstruction module 174 via signal paths 179, 180, 181, and 182, respectively.

In this example, the transmitter 146 is in signal communication with the receiver 174 via signal path 157 and is configured to transmit the combined transmit sequence 156 to the receiver 174 as a modulated signal 159. The receiver 174 is configured to receive the modulated signal 159 and produce a received combined sequence 185 which is passed to the receive buffer 167. The received combined sequence 185 includes a received first encoded sequence and a received second encoded sequence that correspond to the transmitted first encoded sequence 140 and transmitted flipped second encoded sequence 144, respectively, of the combined transmit sequence 156.

The receive buffer 167 includes a first portion 183 of the receive buffer 167 and a second portion 184 of the receive buffer 167. The first portion 183 of the receive buffer 167 is configured to receive and store the received first encoded sequence of the received combined sequence 185 and the second portion 184 of the receive buffer 167 is configured to receive and store a received second encoded sequence of the received combined sequence 185. As such, the receive buffer 167 stores the combined encoded sequence 185 within the receive buffer 167 that includes both the received first encoded sequence and the received second encoded sequence in a received sequential order. In operation, the combined encoded sequence 185 is passed from the receiver buffer 167 to both the first decoder 168 and third flipping module 170 via signal path 176.

Once the combined encoded sequence 185 is received, the first decoder 168 is configured to decode the received first encoded sequence to produce a first decoded sequence 186, while the third flipping module 170 is configured to reverse the received sequential order of the combined encoded sequence 185 to produce a flipped combined encoded sequence 187. The first decoder 168 then is configured to pass the first decoded sequence 186 to the output buffer 172 via signal path 179. The flipped buffer 171 is configured to receive and store the flipped combined encoded sequence 187 and pass it to the second decoder 169. The second decoder 169 is configured to decode the flipped combined encoded sequence 187 to produce a second decoded sequence 188 that is passed to the output buffer 172, where the second decoder 169 is configured to decode the received second encoded sequence from the flipped combined encoded sequence 187 to produce a second decoded sequence 188. The output buffer 172 is configured to receive and store a first decoded segment 189 from the first decoded sequence 186 and a second decoded segment 190 from the second decoded sequence 188.

The reconstruction module 173 in signal communication with the output buffer 172 (via signal paths 181 and 182) and is configured to produce a reconstructed image 191 from the combined first decoded segment 189 and second decoded segment 190 that are passed to the reconstruction module 173 via signal paths 181 and 182, respectively.

In this example, the BLED system 100 further includes a first counter 192 in signal communication with the first decoder 168, via signal path 193, and a second counter 194 in signal communication with the second decoder 169 via signal path 195. The first counter 192 is configured to count a number of first reconstructed pixel values within the first decoded sequence 186 produced by the first decoder 168 and the second counter 194 is configured to count a number of second reconstructed pixel values within the second decoded sequence 188 produced by the second decoder 194.

Additionally, in this example, the first and second encoders 108 and 110 are entropy encoders and the first and second decoders 168 and 194 are entropy decoders. As an example, the entropy encoders 108 and 110 and decoders 168 and 194 may utilize Huffman coding. Furthermore, the first encoder 108 may utilize a first Huffman coding and the second encoder 110 may utilize a modified Huffman coding, where the modified Huffman coding includes reversing the order of the second encoded sequence 142 to produce the flipped second encoded sequence 144. Moreover, the first encoder 108 and the second encoder 110 may be configured to utilize the same Huffman table and the first decoder 168 and the second decoder 194 may be configured to utilize the same Huffman table.

In this disclosure, the circuits, components, modules, and/or devices of, or associated with, the improved BLED system 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In an example of operation, the BLED system 100 receives the acquired image 102, partitions the acquired image 102 into the least two segments (i.e., first scanned segment 128 and second scanned segment 132), and raster scans each segment of the at least two segments 128 and 132 of the acquired image 102 to produce the first sequence of P from $P_1$ of the acquired image 102 to $$P_{\frac{MN}{2}}$$

and a second sequence of P of the acquired image 102 from the $$P_{\frac{MN}{2}+1}$$

to the $P_{MN}$, where the $P_{MN}$ is the last P of the acquired image 102.

The input buffer 114 then saves the first sequence of P 138 as the first segment 128 within the first portion 126 of an input buffer 114 and the second sequence of P 134 as the second segment 132 within the second portion 130 of the input buffer 114. The order of the second sequence of P 134 within the second segment 132 is reversed by the first flipping module 106 to produce the flipped second sequence of P 136. Specifically, in this example, the order of the sequence of pixel values within the second segment 134 is reversed (i.e., flipped) from left to right. The BLED system 100 then encodes the first sequence of P 138 utilizing the first encoder 108 to produce the first encoded sequence 140 and also encodes the flipped second sequence of P 136 utilizing a second encoder 110 to produce the second encoded sequence 142. The second flipping module 112 then reverses the order of the second encoded sequence 142 to produce the flipped second encoded sequence 144 and the transmit buffer 114 stores the first encoded sequence 140 in the first portion 152 of the transmit buffer 114, and the flipped second encoded sequence 144 in the second portion 154 of the transmit buffer 114. The first encoded sequence 140 and flipped second encoded sequence 144 are then transmitted in a serial order as a combined transmit sequence 156 by the transmitter 146 to the receiver 174 via signal path 157.

Once received by the receiver 174, the BLED system 100 stores the received combined sequence 185 in the receiver buffer 167 that includes the first portion 183 and second portion 184 of the receiver buffer 167, where the received first encoded sequence of the received combined sequence 185 is stored in the first portion 183 and the second encoded sequence of the received combined sequence 185 is stored in the second portion 184. As such, the receive buffer 167 stores the combined encoded sequence 185 within the receive buffer 167 that includes both the received first encoded sequence and the received second encoded sequence in a received sequential order. The combined encoded sequence 185 is then passed from the receiver buffer 167 to both the first decoder 168 and third flipping module 170 via signal path 176.

Once the combined encoded sequence 185 is received by the first decoder 168, the first decoder 168 decodes the received first encoded sequence (of the combined encoded sequence 185) to produce the first decoded sequence 186. In this example, the first decoder 168 utilizes the first counter 192 to count the number of first reconstructed pixel values within the first decoded sequence 186 produced by the first decoder 168. If the first counter 192 has not counted half the number of total pixels in the image (i.e., $$\frac{MN}{2}$$

pixels), the first decoder 168 continues to decode the received first encoded sequence until the first counter 192 counts to $$\frac{MN}{2}.$$

Once the first counter 192 reaches a count equal to $$\frac{MN}{2},$$

the first decoder 168 sends the first decoded sequence 186 to the first output segment 189 of the output buffer 172.

Simultaneously (i.e., in parallel), once the combined encoded sequence 185 is received by the third flipping module 170, the third flipping module 170 reverses the received sequential order of the combined encoded sequence 185 to produce the flipped combined encoded sequence 187. The flipped combined encoded sequence 187 is initially stored in a flipped buffer 171 and then passed to the second decoder 169. Once the flipped combined encoded sequence 187 is received by the second decoder 168, the second decoder 169 decodes the flipped combined encoded sequence 187 to produce the second decoded sequence 188.

In this example, the second decoder 169 utilizes the second counter 194 to count the number of second reconstructed pixel values within the second decoded sequence 188 produced by the second decoder 169. If the second counter 194 has not counted half the number of total pixels in the image (i.e., $$\frac{MN}{2}$$

pixels), the second decoder 169 continues to decode the flipped combined encoded sequence 187 until the second counter 194 counts to $$\frac{MN}{2}.$$

Once the second counter 194 reaches a count equal to $$\frac{MN}{2},$$

the second decoder 169 sends the second decoded sequence 188 to the second output segment 190 of the output buffer 172. Once the reconstruction module 173 receives the first decoded signal 186 and the second decoded signal 188, the reconstruction module 173, in step 840, produces a reconstructed image 191 that is a reconstruction of the acquired image 102. The process then ends 842.

Figure 2:
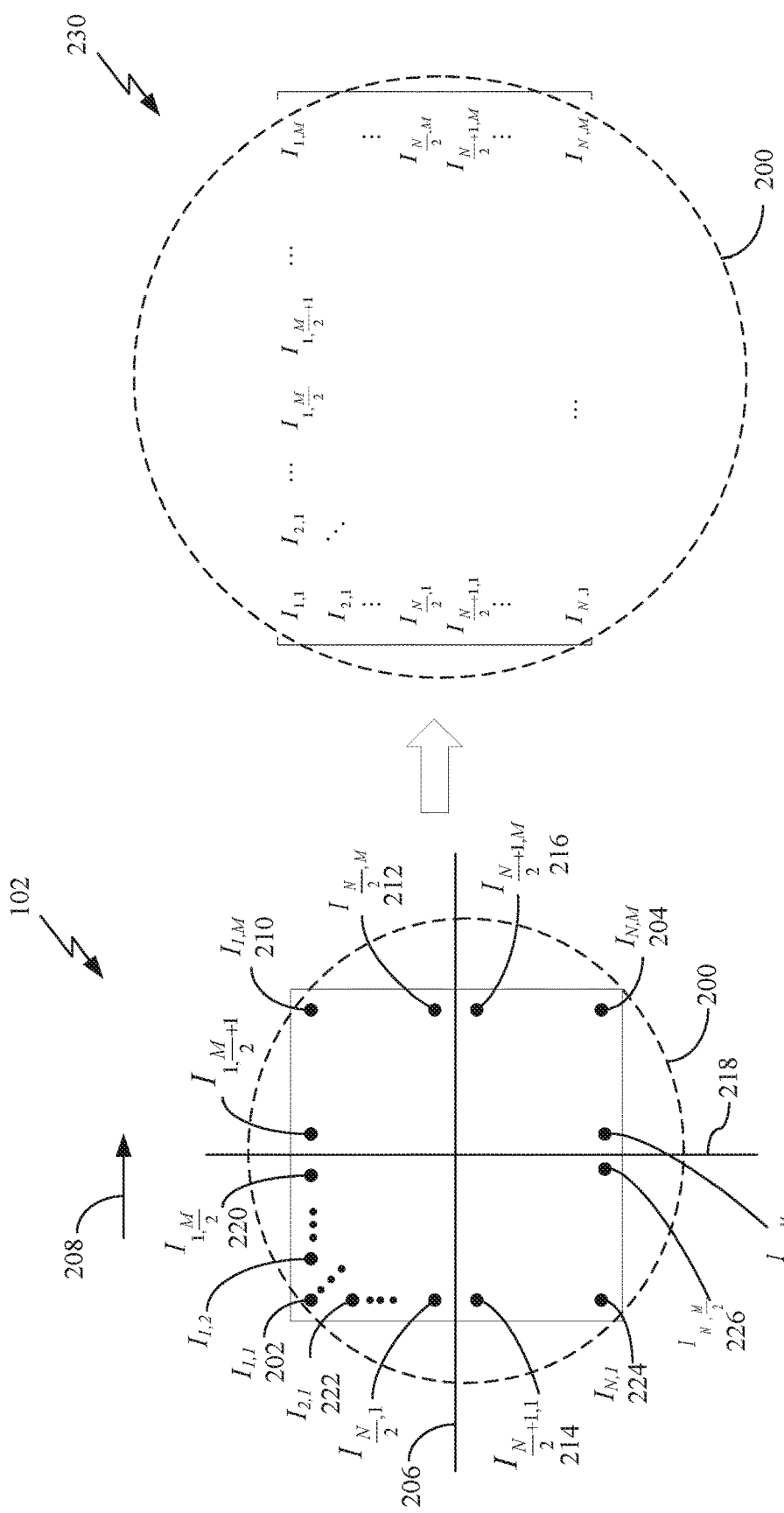
FIG. 2A shows a block diagram of an example of an acquired image having a plurality of pixels that is acquired by the BLED system of FIG. 1 in accordance with the present disclosure.
FIG. 2B shows an example of a two-dimensional array of Cartesian pixel values for the plurality of pixels shown in FIG. 2A in accordance with the present disclosure.

Turning to FIG. 2A, a block diagram of an example of an acquired image 102, having a plurality of pixels 200, that is acquired by the BLED system 100 is shown in accordance with the present disclosure. The individual pixels ("I") of the plurality of pixels 200 are shown as individual pixels I (herein referred to as Cartesian pixels) that range from $I_{1,1}$ 202 to $I_{N,M}$ 204 based on a two-dimensional a Cartesian coordinate system. These Cartesian pixels correspond to the previously described pixels (i.e., P) in that P is a one-dimensional array of pixels where the pixels P range from $P_1$ to $P_{MN}$ for the acquired image.

In this example, the acquired image 102 may be segmented either vertically or horizontally. If vertically, the acquired image 102 may be divided (i.e., partitioned) into two segments (i.e., first scanned segment 128 and second scanned segment 132) that are shown as being the Cartesian pixels above a vertical half-point dividing axis 206 and below the vertical half-point dividing axis 206. In this example, the one-dimensional array of pixels P would run from left to right (along direction 208) in a raster scan fashion. As such, for example, Cartesian pixels $I_{1,1}$ 202 correspond to $P_1$, $I_{1,M}$ 210 correspond to $P_M$, $$I_{\frac{N}{2},M}$$

212 correspond to $$P_{\frac{MN}{2}},\ I_{\frac{N}{2}+1,1}$$

214 correspond to $$P_{\frac{MN}{2}+1},\ I_{\frac{N}{2}+1,M}$$

216 correspond to $$P_{\frac{M}{2}(N+2)},$$

and $I_{N,M}$ 204 correspond to $P_{MN}$.

If instead, the acquired image 102 is segmented horizontally into two segments (i.e., first scanned segment 128 and second scanned segment 132), the two segments may be instead defined by the Cartesian pixels to left of the horizontal half-point dividing axis 218 and to the right of the horizontal half-point dividing axis 218 along the direction 208. In this example, the first segment of the acquired signal (corresponding to the first scanned segment 128) may be raster scanned by the first scanner 158 from $I_{1,1}$ 202 to $$I_{1,\frac{M}{2}},$$

from $I_{2,1}$ 222 to $I_{N,1}$ 224 and then to $$I_{N,\frac{M}{2}}$$

226. In this vertical segmentation example, the raster scan of Cartesian pixels $I_{1,1}$ 202 to $$I_{N,\frac{M}{2}}$$

226 would correspond to the one-dimensional array of pixels $P_1$ to $$P_{\frac{MN}{2}}.$$

Similarly, the second segment (corresponding to the second scanned segment 132) may be raster scanned by the second scanner 160 from $I_{1,M}$ 210 to $$I_{N,\frac{M}{2}+1}$$

228 and then to $I_{N,M}$ 204, which correspond to the one-dimensional array of pixels $$P_{\frac{MN}{2}+1}$$

to $P_{MN}$. In this example, the raster scan is effectively from right to left (in the opposite direction of direction 208) because the first flipping module 106 receives the second scanned segment 132 with the second sequence of P 134 (i.e., $$P_{\frac{MN}{2}+1}$$

to $P_{MN}$) and reverse the order to produce the flipped second sequence of P 136 (i.e., $P_{MN}$ to $$P_{\frac{MN}{2}+1}).$$

In FIG. 2B, an example of a two-dimensional matrix array 230 of Cartesian pixel values $I_{1,1}$ 202 to $I_{N,M}$ 204 is shown corresponding to the plurality of pixels 200 on the acquired image 102 shown in FIG. 2A in accordance with the present disclosure.

Figure 3:
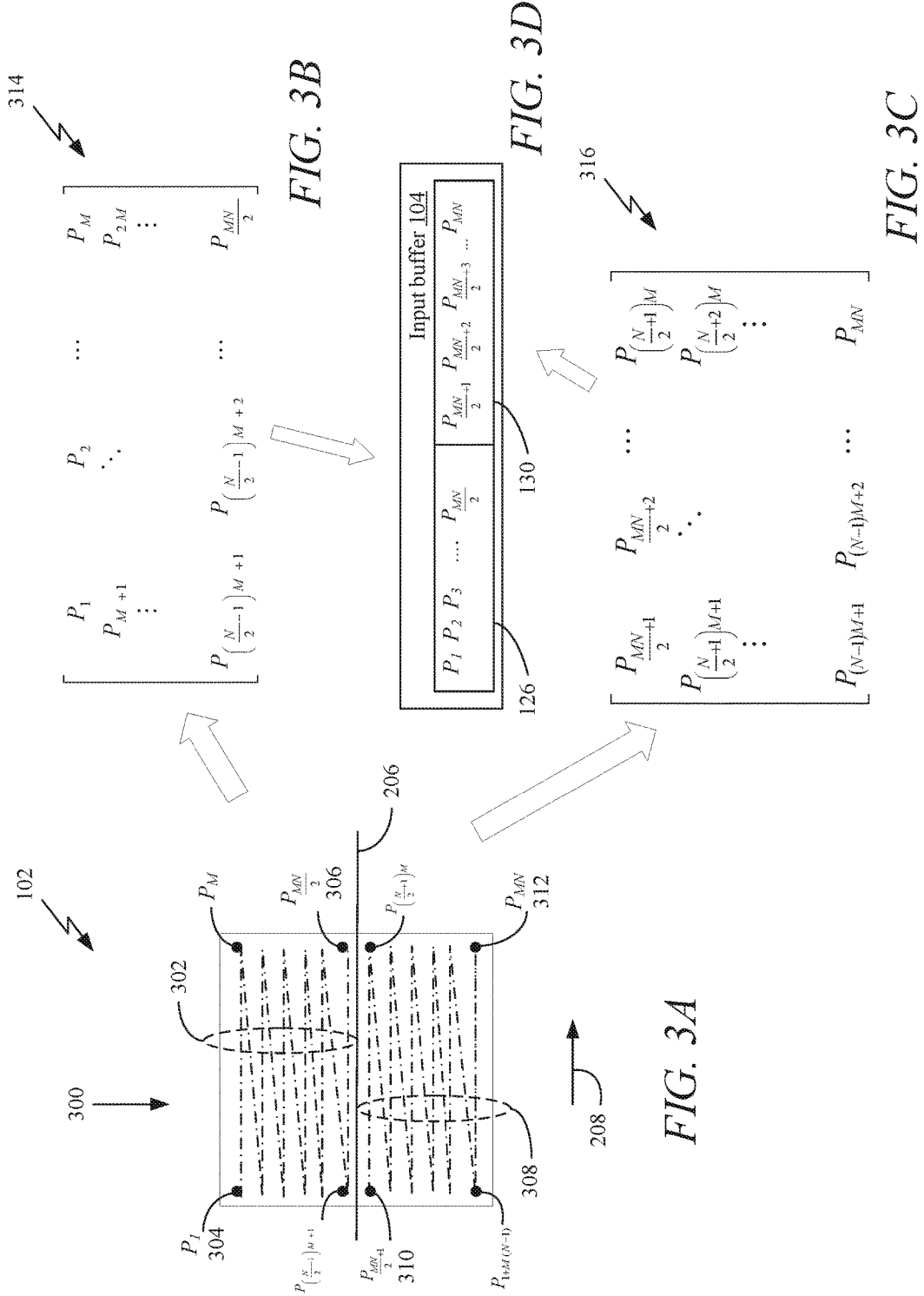
FIG. 3A shows a block diagram of the acquired image shown in FIG. 2A segmented in the vertical direction as divided by the vertical half-point dividing axis of the acquire image in accordance with the present disclosure.
FIG. 3B shows a two-dimensional array of pixel values for a first plurality of pixels shown in the first segmentation of the acquired image in accordance with the present disclosure.
FIG. 3C shows a two-dimensional array of pixel values for a second plurality of pixels shown in the second segmentation of the acquired image in accordance with the present disclosure.
FIG. 3D shows a block diagram of the input buffer, shown in FIG. 1, including a first scanned segment of a first sequence of pixel values and second scanned segment of a second sequence of pixel values in accordance with the present disclosure.

Turning to FIG. 3A, a block diagram is shown of the acquired image 102 (shown in FIG. 2A) segmented in the vertical direction 300 as divided by the vertical half-point dividing axis 206 of the acquire image 102 in accordance with the present disclosure. Similar to the vertical segmentation example described in FIGS. 2A and 2B, the acquired image 102 is shown as being raster scanned in the direction 208 from left to right. In this example, the pixel values P are shown instead of the Cartesian pixel I shown in FIGS. 2A and 2B, where the first scanned segment 128 is first raster scanned 302 along the acquired image 102 (by the first scanner 158) to produce the first sequence of P 138 from $P_1$ 304 to $$P_{\frac{MN}{2}}$$

306 and the second scanned segment 132 is second raster scanned 308 along the acquired image 102 (by the second scanner 160) to produce the second the sequence of P 134 from $$P_{\frac{MN}{2}+1}$$

310 to $P_{MN}$ 312.

In FIG. 3B, a two-dimensional array 314 of pixel values P is shown for a first plurality of pixels (i.e., the first sequence of P 138 from $P_1$ 304 to $$P_{\frac{MN}{2}}$$

306) shown in the first segmentation (i.e., the first scanned segment 128) of the acquired image 102 in accordance with the present disclosure. Similarly, in FIG. 3C, a two-dimensional array 316 of pixel values is shown for a second plurality of pixels (i.e., the second the sequence of P 134 from $$P_{\frac{MN}{2}+1}$$

310 to $P_{MN}$ 312) shown in the second segmentation (i.e., the second scanned segment 132) of the acquired image 102 in accordance with the present disclosure. In FIG. 3D, a block diagram of the input buffer 104 including the first scanned segment 128 of a first sequence of pixel values (i.e., the first sequence of P 138 from $P_1$ 304 to $$P_{\frac{MN}{2}}$$

306) and second scanned segment 132 of a second sequence of pixel values (i.e., the second the sequence of P 134 from $$P_{\frac{MN}{2}+1}$$

310 to $P_{MN}$ 312) is shown in accordance with the present disclosure.

Figure 4:
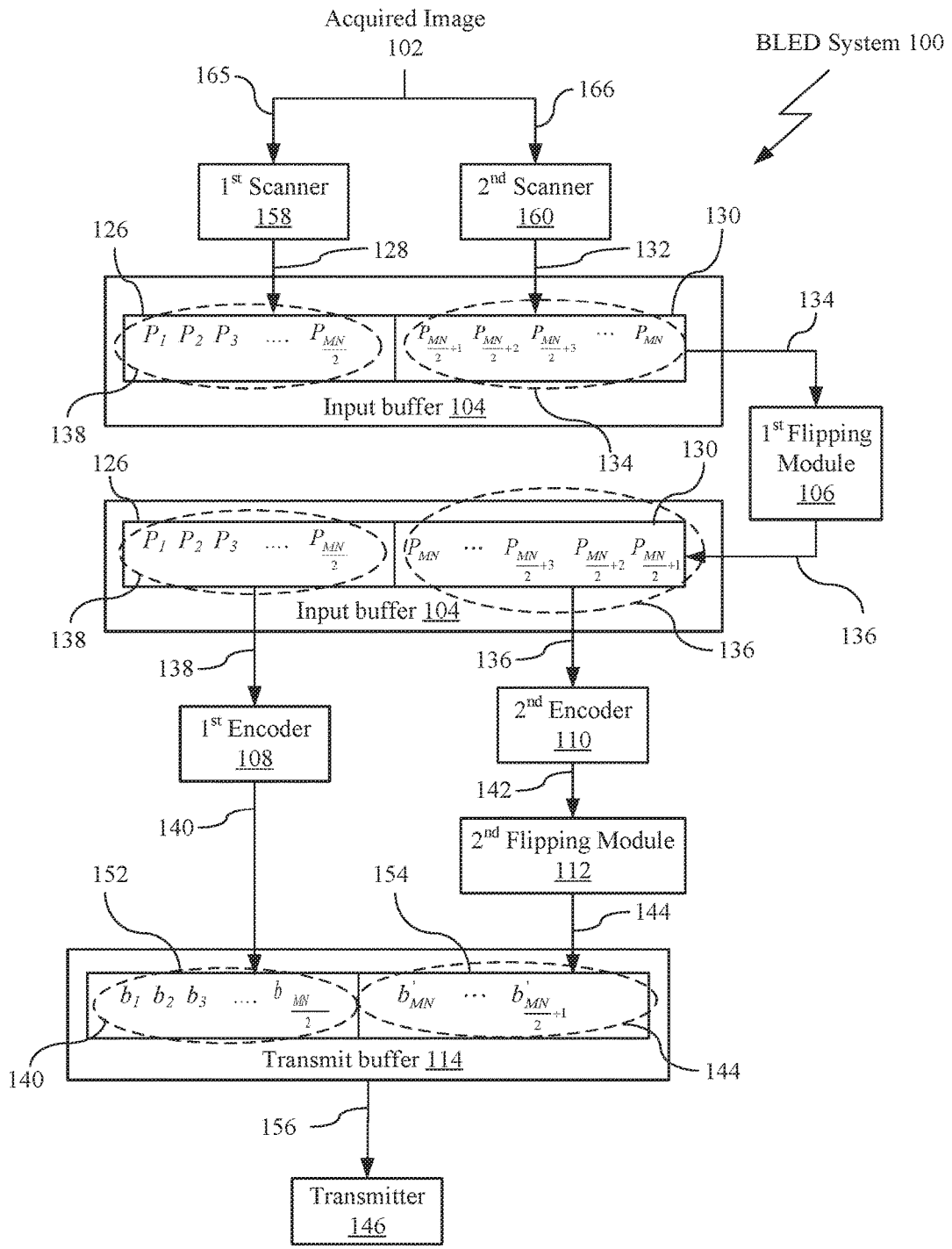
FIG. 4 shows a system block diagram of an example of an implementation of a transmit portion of the BLED system for encoding the acquired image that has been segmented along a vertical direction (as shown in FIGS. 3A through 3D) in accordance with the present disclosure.

Turing to FIG. 4, a system block diagram is shown of an example of an implementation of a transmit portion of the BLED system 100 for encoding the acquired image 102 that has been segmented along a vertical direction (i.e., the vertical half-point dividing axis 206) in accordance with the present disclosure. In this example, the first and second scanners 158 and 160, input buffer 104, first flipping module 106, first and second encoders 108 and 110, second flipping module 112, transmit buffer 114, and transmitter 146 are shown as in FIG. 1. However, in FIG. 4 more detail is shown regarding the processing of the scanned pixels from the acquired image 102 showing how the sequence of pixels are saved in the input buffer 104, flipped by the first flipping module 106, re-saved in the input buffer 104, encoded by the encoders 108 and 110, flipped again by the second flipping module 112, saved in the transmit buffer 114, and transmitted by the transmitter 146.

As discussed earlier with regards to FIGS. 1 and 3A through 3D, the BLED system 100 receives the acquired image 102, partitions the acquired image 102 into the least two segments (i.e., first scanned segment 128 and second scanned segment 132), and raster scans each segment of the at least two segments 128 and 132 of the acquired image 102 to produce the first sequence of P 138 from $P_1$ of the acquired image 102 to $$P_{\frac{MN}{2}}$$

and a second sequence of P 134 of the acquired image 102 from the $$P_{\frac{MN}{2}+1}$$

to the $P_{MN}$, where the $P_{MN}$ is the last P of the acquired image 102.

The input buffer 114 then saves the first sequence of P 138 as the first segment 128 within the first portion 126 of an input buffer 114 and the second sequence of P 134 as the second segment 132 within the second portion 130 of the input buffer 114. The order of the second sequence of P 134 within the second portion 130 is reversed by the first flipping module 106 to produce the flipped second sequence of P 136. Again, in this example, the order of the sequence of pixel values within the second portion 130 is reversed (i.e., flipped) from left to right such that the flipped second sequence of P 136 is from $P_{MN}$ to $$P_{\frac{MN}{2}+1}.$$

The BLED system 100 then encodes the first sequence of P 138 utilizing the first encoder 108 to produce the first encoded sequence 140 and also encodes the flipped second sequence of P 136 utilizing the second encoder 110 to produce the second encoded sequence 142. The second flipping module 112 then reverses the order of the second encoded sequence 142 to produce the flipped second encoded sequence 144 and the transmit buffer 114 stores the first encoded sequence 140 in the first portion 152 of the transmit buffer 114, and the flipped second encoded sequence 144 in the second portion 154 of the transmit buffer 114.

In this example, the encoded sequences resulting from encoding $P_1$ to $$P_{\frac{MN}{2}}$$

(i.e., first sequence of P 138) and $P_{MN}$ to $$P_{\frac{MN}{2}+1}$$

(i.e., flipped second sequence of P 136) may be represented by $b_1$ to $$b_{\frac{MN}{2}}$$

(i.e., first encoded sequence 140) and $$b_{\frac{MN}{2}+1}$$

to $b_{MN}$ (i.e., second encoded sequence 142) respectively, where the first encoded sequence 140 is stored in the first portion 152 of the transmit buffer 114. The second encoded sequence 142 is reversed sequentially by the second flipping module 112 to produce the flipped second encoded sequence 144 that may be represented by $b_{MN}$ to $$b_{\frac{MN}{2}+1}$$

that is stored in the second portion 154 of the transmit buffer 114. The combined transmit sequence 156 of $b_1$ to $$b_{\frac{MN}{2}}$$

and $b_{MN}$ to $$b_{\frac{MN}{2}+1}$$

is then sequentially transmitted by the transmitter 146 to the receiver 174.

In FIG. 5A, a block diagram is shown of the acquired image 102 (shown in FIG. 2A) segmented in the horizontal direction 208 as divided by the horizontal half-point dividing axis 218 of the acquire image 102 in accordance with the present disclosure. Similar to the horizontal segmentation example described in FIGS. 2A and 2B, the acquired image 102 is shown as being raster scanned in the direction 208 from left to right. In this example, the pixel values L and R are shown instead of P or the Cartesian pixel I shown in FIGS. 2A and 2B. In this example, the pixel values L represent the pixel values P on the left-hand side 500 of the horizontal half-point dividing axis 218 while the pixel values R represent the pixel values P on the right-hand side 502 of the horizontal half-point dividing axis 218. As such, the first scanned segment 128 is the first raster scanned 504 along the acquired image 102 (by the first scanner 158) to produce the first sequence of P 138 from $P_1$ to $$P_{\frac{MN}{2}}$$

represented by $L_1$ 506 to $$L_{\frac{MN}{2}}$$

508 and the second scanned segment 132 is the second raster scanned 510 along the acquired image 102 (by the second scanner 160) to produce the second the sequence of P 134 from $$P_{\frac{MN}{2}+1}$$

to $P_{MN}$ represented by $R_1$ 512 to $$R_{\frac{MN}{2}}$$

514.

In FIG. 5B, a two-dimensional array 516 of pixel values is shown for a first plurality of pixels (i.e., the first sequence of P 138 from $L_1$ 506 to $$L_{\frac{MN}{2}}$$

508) on the left-hand side shown in the first segmentation 500 (i.e., the first scanned segment 128) of the acquired image 102 in accordance with the present disclosure. Similarly, in FIG. 5C, a two-dimensional array 518 of pixel values is shown for a second plurality of pixels (i.e., the second the sequence of P 134 from $R_1$ 512 to $$R_{\frac{MN}{2}}$$

514) shown in the second segmentation 502 (on the right-hand side of the acquired image 102) in accordance with the present disclosure. The second segmentation 502 is the second scanned segment of the acquired image 102 from $R_1$ 512 to $$R_{\frac{MN}{2}}$$

514 that corresponds to the second the sequence of P 134 from $$P_{\frac{MN}{2}+1}$$

to $P_{MN}$. In FIG. 5D, a block diagram is shown of the input buffer 114 including the first scanned segment 128 of a first sequence of pixel values (i.e., the first sequence of P 138 from $L_1$ 506 to $$L_{\frac{MN}{2}}$$

508) for the left-hand side of the acquired image 102 in the first portion 126 of the input buffer 104 and second scanned segment 132 of the second sequence of pixel values (i.e., the second the sequence of P 134 from $R_1$ 512 to $$R_{\frac{MN}{2}}$$

514) for the right-hand side of the acquired image 102 in the second portion 130 of the input buffer 104 in accordance with the present disclosure.

Figure 6:
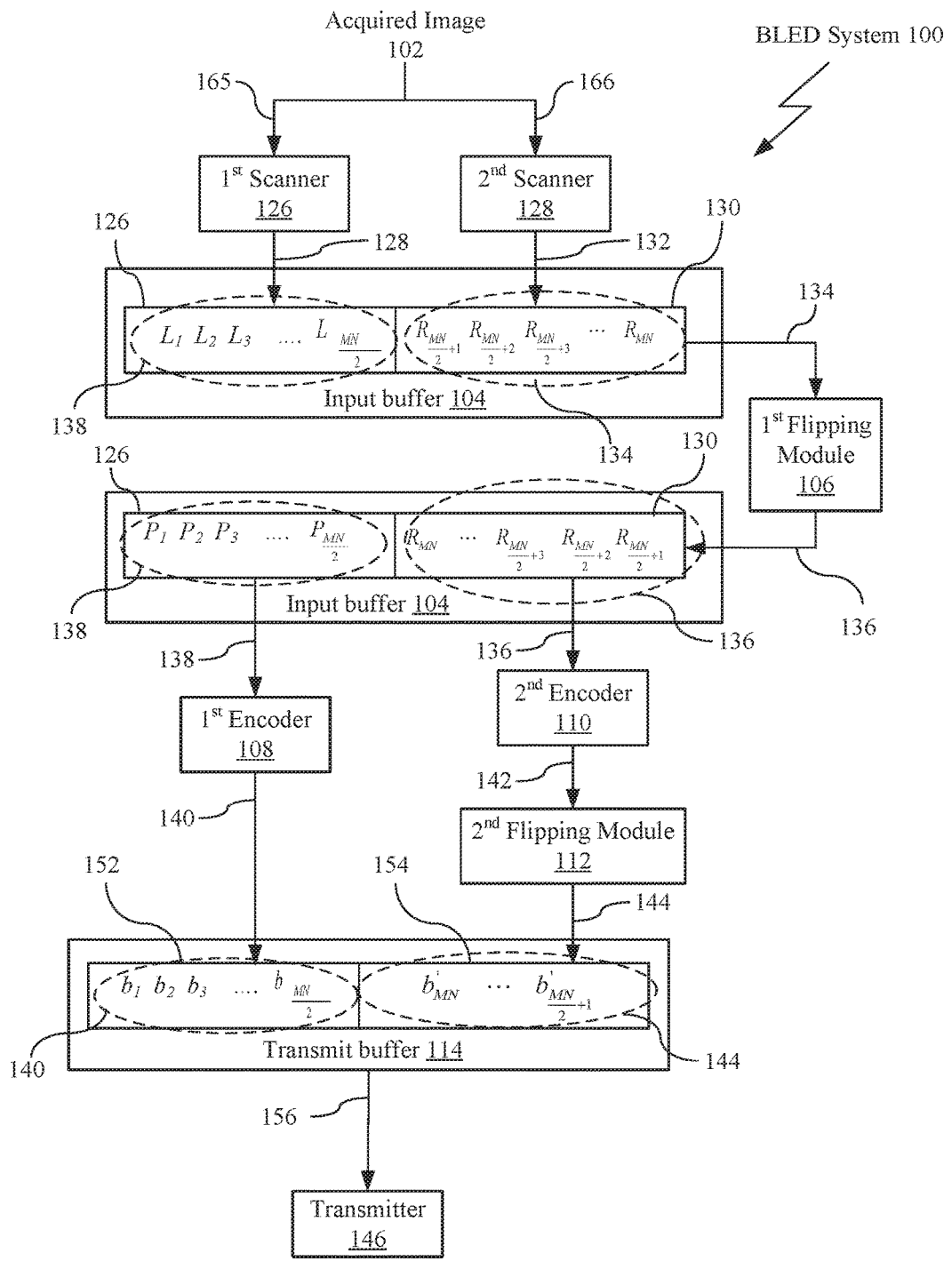
FIG. 6 shows a system block diagram of an example of an implementation of a transmit portion of the BLED system for encoding the acquired image that has been segmented along a horizontal direction (as shown in FIGS. 5A through 5D) in accordance with the present disclosure.

Turing to FIG. 6, a system block diagram is shown of an example of an implementation of a transmit portion of the BLED system 100 for encoding the acquired image 102 that has been segmented along a horizontal direction (i.e., horizontal half-point dividing axis 218) in accordance with the present disclosure. In this example, the first and second scanners 158 and 160, input buffer 104, first flipping module 106, first and second encoders 108 and 110, second flipping module 112, transmit buffer 114, and transmitter 146 are shown as in FIGS. 1 and 4. However, similar to FIG. 4, in FIG. 6 more detail is shown regarding the processing of the scanned pixels from the acquired image 102 showing how the sequence of pixels are saved in the input buffer 104, flipped by the first flipping module 106, re-saved in the input buffer 104, encoded by the encoders 108 and 110, flipped again by the second flipping module 112, saved in the transmit buffer 114, and transmitted by the transmitter 146.

As discussed earlier with regards to FIGS. 1, 3A through 3D, 4, and 5A through 5D, the BLED system 100 receives the acquired image 102, partitions the acquired image 102 into the least two segments (i.e., first scanned segment 128 and second scanned segment 132), and raster scans each segment of the at least two segments 128 and 132 of the acquired image 102 to produce the first sequence of P 138 from $L_1$ of the acquired image 102 to $$L_{\frac{MN}{2}}$$

(corresponding to $P_1$ of the acquired image 102 to $$P_{\frac{MN}{2}}$$

) and a second sequence of P 134 of the acquired image 102 from the $$R_{\frac{MN}{2}+1}$$

to the $R_{MN}$ (corresponding to $$P_{\frac{MN}{2}+1}$$

to the $P_{MN}$), where the ($R_{MN}$ corresponding to $P_{MN}$) is the last P of the acquired image 102.

The input buffer 114 then saves the first sequence of P 138 as the first segment 128 within the first portion 126 of an input buffer 104 and the second sequence of P 134 as the second segment 132 within the second portion 130 of the input buffer 114. The order of the second sequence of P 134 within the second portion 130 is reversed by the first flipping module 106 to produce the flipped second sequence of P 136. Again, in this example, the order of the sequence of pixel values within the second portion 130 is reversed (i.e., flipped) from left to right such that the flipped second sequence of P 136 is from $R_{MN}$ to $$R_{\frac{MN}{2}+1}.$$

The BLED system 100 then encodes the first sequence of P 138 utilizing the first encoder 108 to produce the first encoded sequence 140 and also encodes the flipped second sequence of P 136 utilizing the second encoder 110 to produce the second encoded sequence 142. The second flipping module 112 then reverses the order of the second encoded sequence 142 to produce the flipped second encoded sequence 144 and the transmit buffer 114 stores the first encoded sequence 140 in the first portion 152 of the transmit buffer 114, and the flipped second encoded sequence 144 in the second portion 154 of the transmit buffer 114.

In this example, the encoded sequences resulting from encoding $L_1$ to $$L_{\frac{MN}{2}}$$

(i.e., first sequence of P 138) and $R_{MN}$ to $$R_{\frac{MN}{2}+1}$$

(i.e., flipped second sequence of P 136) may be represented by $b_1$ to $$b_{\frac{MN}{2}}$$

(i.e., first encoded sequence 140) and $$b_{\frac{MN}{2}+1}$$

to $b_{MN}$ (i.e., second encoded sequence 142) respectively, where the first encoded sequence 140 is stored in the first portion 152 of the transmit buffer 114. The second encoded sequence 142 is reversed sequentially by the second flipping module 112 to produce the flipped second encoded sequence 144 that may be represented by $b_{MN}$ to $$b_{\frac{MN}{2}+1}$$

that is stored in the second portion 154 of the transmit buffer 114. The combined transmit sequence 156 of $b_1$ to $$b_{\frac{MN}{2}}$$

and $b_{MN}$ to $$b_{\frac{MN}{2}+1}$$

is then sequentially transmitted by the transmitter 146 to the receiver 174.

Figure 7:
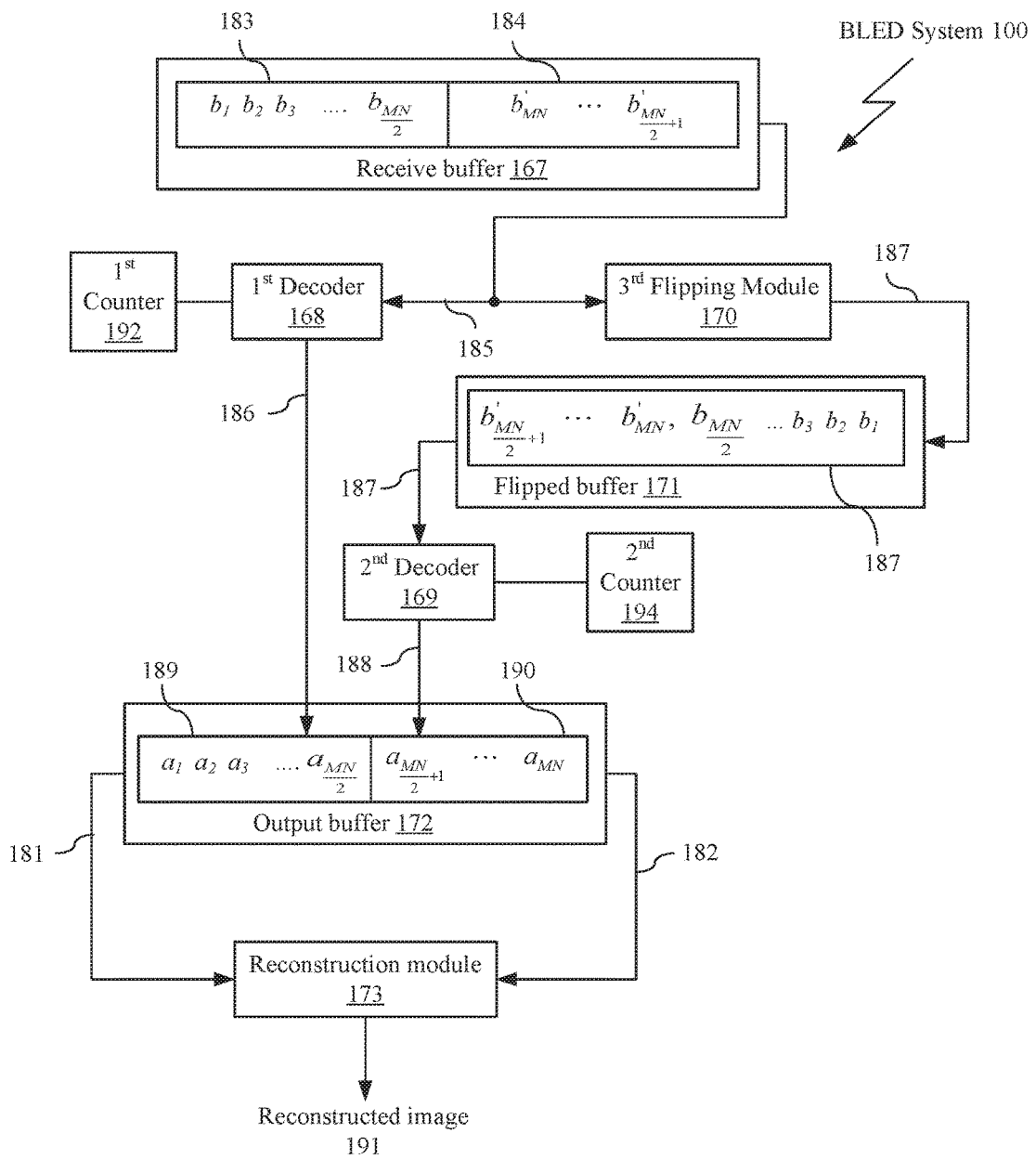
FIG. 7 shows a system block diagram of an example of an implementation of the receiver portion of the BLED system for reconstructing the acquired image in accordance with the present disclosure.

In FIG. 7, a system block diagram is shown of an example of an implementation of the receiver portion of the BLED system 100 for reconstructing the acquired image 102 in accordance with the present disclosure. In this example, the receive buffer 167, the first and second decoders 168 and 169, third flipping module 170, first and second counters 192 and 194, flipped buffer 171, output buffer 172, and the reconstruction module 173 are shown as in FIGS. 1 and 4. However, in FIG. 7 more detail is shown regarding the processing of the received combined transmit sequence 156 of $b_1$ to $$b_{\frac{MN}{2}}$$

and $b_{MN}$ to $$b_{\frac{MN}{2}+1}$$

from the transmitter 146 (i.e., combined sequence 185) showing how the combined sequence 185 is saved sequentially in the receive buffer 167 in the first and second portions 183 and 184 of the receive buffer 167, decoded by the first decoder 168 to produce the first decoded sequence 186, flipped by the third flipping module 170 to produce the flipped combined encoded sequence 187 (i.e., $$b_{\frac{MN}{2}+1}$$

to $b_{MN}$ and $$b_{\frac{MN}{2}}$$

to $b_1$), and saved in the flipped buffer 171. Additionally shown is how the first decoded sequence 186 (shown as $a_1$ to $$a_{\frac{MN}{2}})$$

is saved in the first portion 189 of the output buffer 172 and how the flipped combined encoded sequence 187 is decoded by the second decoder 188 to produce the second decoded sequence 188 (shown as $$a_{\frac{MN}{2}+1}$$

to $a_{MN}$) that is stored in the second portion 190 of the output buffer 172. The reconstruction module that receives the combined first decoded sequence 186 and second decoded sequence 188 to produce the reconstructed image 191.

Figure 8:
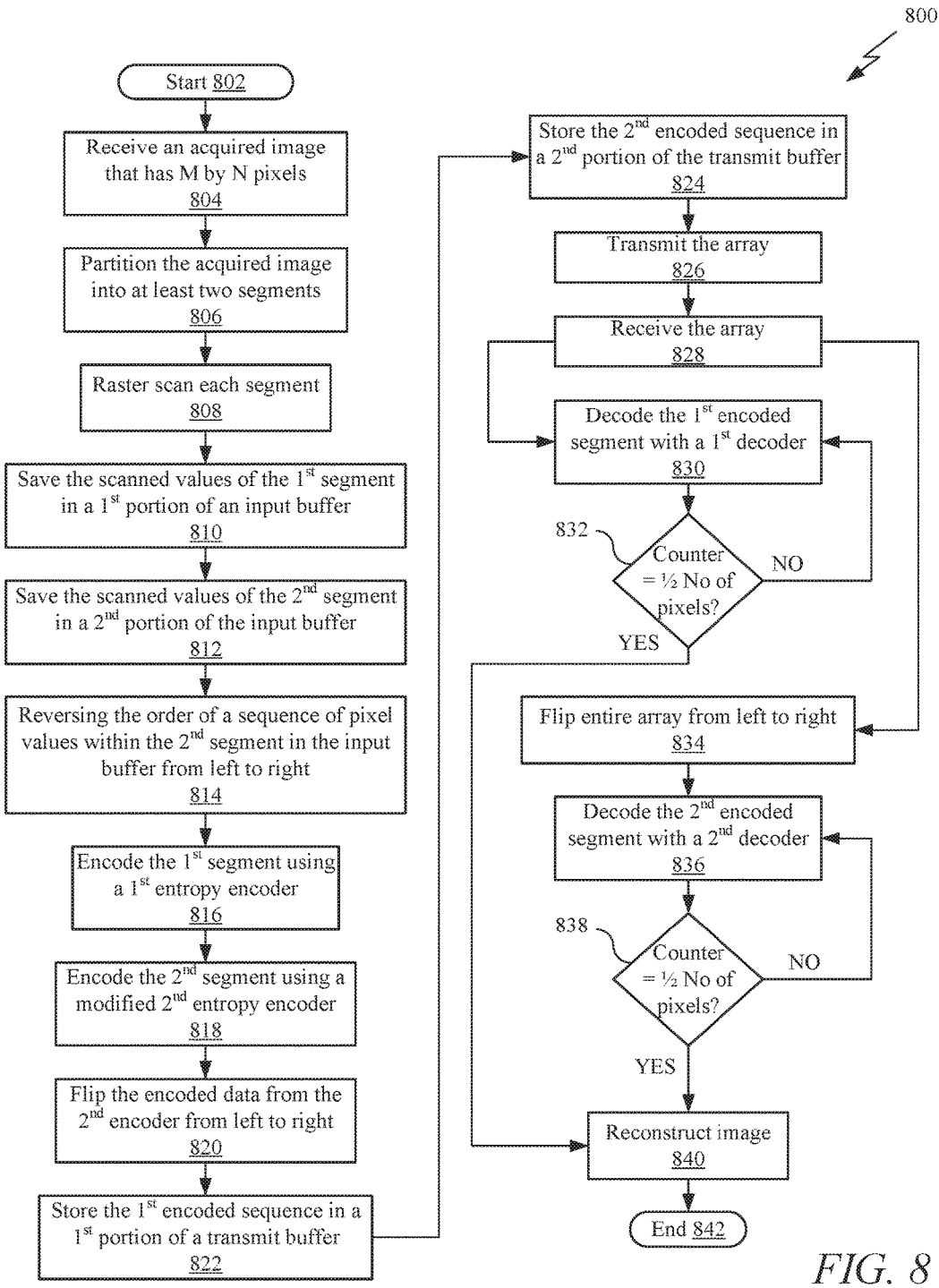
FIG. 8 shows a flowchart that describes the steps performed by the BLED system when in operation in accordance with the present disclosure.

In FIG. 8, a flowchart is shown of a method 800 performed by the BLED system 100 when in operation in accordance with the present disclosure. The method 800 starts 802 by receiving 804 the acquired image 102, partitioning 806 the acquired image 102 into at least two segments (i.e., first scanned segment 128 and second scanned segment 132), and raster scanning 808 each segment of the at least two segments 128 and 132 of the acquired image 102 to produce a first sequence of P 138 from $P_1$ of the acquired image 102 to $P_{MN/2}$ and a second sequence of P 134 of the acquired image 102 from the $P_{MN/2+1}$ to the $P_{MN}$, where the $P_{MN}$ is the last P of the acquired image 102.

The input buffer 114 then saves 810 and 812 the first sequence of P 138 as the first segment 128 within the first portion 126 of an input buffer 114 and the second sequence of P 134 as the second segment 132 within the second portion 130 of the input buffer 114. The order of the second sequence of P 134 within the second segment 132 is reversed 814 by the first flipping module 106 to produce the flipped second sequence of P 136. Specifically, in this example, the order of the sequence of pixel values within the second segment 134 is reversed (i.e., flipped) from left to right. The method 800 then encodes 816 the first sequence of P 138 utilizing the first encoder 108 to produce the first encoded sequence 140 and also encodes 818 the flipped second sequence of P 136 utilizing a second encoder 110 to produce the second encoded sequence 142. The second flipping module 112 then reverses 820 the order of the second encoded sequence 142 to produce the flipped second encoded sequence 144 and the transmit buffer 114 stores 822 and 824 the first encoded sequence 140 in the first portion 152 of the transmit buffer 114, and the flipped second encoded sequence 144 in the second portion 154 of the transmit buffer 114. The first encoded sequence 140 and flipped second encoded sequence 144 are then transmitted 826 in a serial order as a combined transmit sequence 156 by the transmitter 146 to the receiver 174 via signal path 157.

Once received 828 by the receiver 174, the method 800 stores the received combined sequence 185 in the receiver buffer 167 that includes the first portion 183 and second portion 184 of the receiver buffer 167, where the received first encoded sequence of the received combined sequence 185 is stored in the first portion 183 and the second encoded sequence of the received combined sequence 185 is stored in the second portion 184. As such, the receive buffer 167 stores the combined encoded sequence 185 within the receive buffer 167 that includes both the received first encoded sequence and the received second encoded sequence in a received sequential order. The combined encoded sequence 185 is then passed from the receiver buffer 167 to both the first decoder 168 and third flipping module 170 via signal path 176.

Once the combined encoded sequence 185 is received by the first decoder 168, the first decoder 168, in step 830, decodes the received first encoded sequence (of the combined encoded sequence 185) to produce the first decoded sequence 186. In this example, the first decoder 168 utilizes the first counter 192 to count the number of first reconstructed pixel values within the first decoded sequence 186 produced by the first decoder 168. If the first counter 192 has not counted half the number of total pixels in the image (i.e., MN/2 pixels), decision step 832 sends the process 800 back to decoding step 830, where the first decoder 168 continues to decode the received first encoded sequence until the first counter 192 counts to MN/2. Once the first counter 192 reaches a count equal to MN/2, the first decoder 168 sends the first decoded sequence 186 to the first output segment 189 of the output buffer 172.

Simultaneously (i.e., in parallel) with steps 830 and 832, once the combined encoded sequence 185 is received by the third flipping module 170, the third flipping module 170 reverses, in step 834, the received sequential order of the combined encoded sequence 185 to produce the flipped combined encoded sequence 187. The flipped combined encoded sequence 187 is initially stored in a flipped buffer 171 and then passed to the second decoder 169. Once the flipped combined encoded sequence 187 is received by the second decoder 168, the second decoder 169, in step 836, decodes the flipped combined encoded sequence 187 to produce the second decoded sequence 188.

In this example, the second decoder 169 utilizes the second counter 194 to count the number of second reconstructed pixel values within the second decoded sequence 188 produced by the second decoder 169. If the second counter 194 has not counted half the number of total pixels in the image (i.e., MN/2 pixels), decision step 838 sends the process 800 back to decoding step 836, where the second decoder 169 continues to decode the flipped combined encoded sequence 187 until the second counter 194 counts to MN/2. Once the second counter 194 reaches a count equal to MN/2, the second decoder 169 sends the second decoded sequence 188 to the second output segment 190 of the output buffer 172. Once the reconstruction module 173 receives the first decoded signal 186 and the second decoded signal 188, the reconstruction module 173, in step 840, produces a reconstructed image 191 that is a reconstruction of the acquired image 102. The process then ends 842.

It will be understood that various aspects or details of the implementations may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A bi-directional lossless encoding and decoding ("BLED") system for encoding and decoding an acquired image having M by N pixel values ("P"), the BLED system comprising:

an input buffer having a first portion and a second portion, wherein the first portion is configured to receive and store a first scanned segment of the acquired image, and the second portion is configured to receive and store a second scanned segment of the acquired image, wherein the first scanned segment includes a first sequence of P from a first pixel value ("$P_1$") of the acquired image to an $MN^{th}$ divided by two pixel value ("$P_{MN/2}$") and the second scanned segment includes a second sequence of P from an $MN^{th}$ divided by two plus one pixel value ("$P_{MN/2+1}$") to an $MN^{th}$ pixel value ("$P_{MN}$"), wherein the $P_{MN}$ is the last P of the acquired image;

a first flipping module in signal communication with the second portion, wherein the first flipping module is configured to reverse an order of the second sequence of P to produce a flipped second sequence of P;

at least two encoders in signal communication with the input buffer, wherein a first encoder is configured to encode the first sequence of P to produce a first encoded sequence and a second encoder is configured to encode the flipped second sequence of P to produce a second encoded sequence;

a second flipping module in signal communication with the second encoder, wherein the second flipping module is configured to reverse an order of the second encoded sequence to produce a flipped second encoded sequence; and a transmit buffer in signal communication with the first encoder, second flipping module, and a transmitter, wherein the transmit buffer has a first portion and a second portion, wherein the first portion of the transmit buffer is configured to receive and store the first encoded sequence, and the second portion of the transmit buffer is configured to receive and store the flipped second encoded sequence, and wherein the transmit buffer is configured to serially feed the transmitter with the first encoded sequence and the flipped second encoded sequence as a combined transmit sequence for transmission by the transmitter.

2. The BLED system of claim 1, further including a first scanner and a second scanner in signal communication with the input buffer or receiving the acquired image, wherein the first scanner is configured to raster scan the MN divided by two pixel values of a first segment of the acquired image from $P_1$ to $P_{MN/2}$ to produce the first scanned segment and the second scanner is configured to raster scan the MN divided by two pixel values of a second segment of the acquired image from $P_{MN/2+1}$ to $P_{MN}$ to produce the second scanned segment.

3. The BLED system of claim 2, further including a receive buffer in signal communication with a receiver, wherein the receive buffer has a first portion of the receive buffer and a second portion of the receive buffer, the first portion of the receive buffer is configured to receive and store a received first encoded sequence corresponding to the transmitted first encoded sequence transmitted by the transmitter, the second portion of the receive buffer is configured to receive and store a received second encoded sequence corresponding to the transmitted flipped second encoded sequence transmitted by the transmitter, and a combined encoded sequence within the receive buffer includes both the received first encoded sequence and the received second encoded sequence in a received sequential order, at least two decoders in signal communication with the receive buffer, wherein a first decoder is configured to decode the received first encoded sequence to produce a first decoded sequence and a second decoder is configured to decode a flipped combined encoded sequence to produce a second decoded sequence, a third flipping module in signal communication with receiver buffer, wherein the third flipping module is configured to reverse the received sequential order of the combined encoded sequence to produce the flipped combined encoded sequence, a flipped buffer in signal communication with the third flipping module and the second decoder, wherein the flipped buffer is configured to receive and store the flipped combined encoded sequence, wherein the second decoder is configured to decode the received second encoded sequence from the flipped combined encoded sequence,
an output buffer in signal communication with both the first decoder and second decoder, wherein the output buffer is configured to receive and store a first decoded segment from the first decoded sequence and a second decoded segment from the second decoded sequence, and
a reconstruction module in signal communication with the output buffer, wherein the reconstruction module is configured produce a reconstructed image from the first decoded segment and second decoded segment.

4. The BLED system of claim 3, further including a first counter in signal communication with the first decoder and a second counter in signal communication with the second decoder, wherein the first counter is configured to count a number of first reconstructed pixel values within the first decoded sequence produced by the first decoder and the second counter is configured to count a number of second reconstructed pixel values within the second decoded sequence produced by the second decoder.

5. The BLED system of claim 4, wherein the first and second encoders are entropy encoders and the first and second decoders are entropy decoders.

6. The BLED system of claim 5, wherein the entropy encoders and decoders utilize Huffman coding.

7. The BLED system of claim 6, wherein the first encoder utilizes a first Huffman coding and the second encoder utilizes a modified Huffman coding, wherein the modified Huffman coding includes reversing the order of the second encoded sequence to produce the flipped second encoded sequence.

8. The BLED system of claim 7, wherein the first encoder and the second encoder are configured to utilize the same Huffman table.

9. The BLED system of claim 8, wherein the first decoder and the second decoder utilize the same Huffman table.

10. A method for encoding and decoding an acquired image having M by N pixel values ("P") with a bi-directional lossless encoding and decoding ("BLED") system, the method comprising:
receiving the acquired image;
partitioning the acquired image into at least two segments;
raster scanning each segment of the at least two segments of the acquired image to produce a first sequence of P from a first pixel value ("$P_1$") of the acquired image to an $MN^{th}$ divided by two pixel value ("$P_{MN/2}$") and a second sequence of P of the acquired image from an $MN^{th}$ divided by two plus one pixel value ("$P_{MN/2+1}$") to an $MN^{th}$ pixel value ("$P_{MN}$"), wherein the $P_{MN}$ is the last P of the acquired image;
saving the first sequence of P as a first segment within a first portion of an input buffer and the second sequence of P as a second segment within a second portion of the input buffer;
reversing an order of the second sequence of P within the second segment to produce a flipped second sequence of P with a first flipping module;
encoding the first sequence of P utilizing a first encoder to produce a first encoded sequence and the flipped second sequence of P utilizing a second encoder;
reversing an order of the second encoded sequence to produce a flipped second encoded sequence;
storing the first encoded sequence in a first portion of a transmit buffer and the flipped second encoded sequence in a second portion of the transmit buffer; and
transmitting the first encoded sequence and flipped second encoded sequence in a serial order with a transmitter.

11. The method of claim 10, wherein raster scanning includes
raster scanning the MN divided by two pixel values of a first segment of the acquired image from $P_1$ to $P_{MN/2}$ to produce the first scanned segment and
raster scanning the MN divided by two pixel values of a second segment of the acquired image from $P_{MN/2+1}$ to $P_{MN}$ to produce the first scanned segment.

12. The method of claim 11, further including
receiving the transmitted first encoded sequence and flipped second encoded sequence with a receiver and a receive buffer having a first portion of the receive buffer and a second portion of the receive buffer,
storing within the first portion, a received first encoded sequence corresponding to the transmitted first encoded sequence transmitted by the transmitter and within the second portion, a received second encoded sequence corresponding to the transmitted flipped second encoded sequence transmitted by the transmitter, wherein a combined encoded sequence within the receive buffer includes both the received first encoded sequence and the received second encoded sequence in a received sequential order,
reversing the order of a received sequential order of the combined encoded sequence with a third flipping module to produce a flipped combined encoded sequence,
decoding the received first encoded sequence with a first decoder to produce a first decoded sequence and the flipped combined encoded sequence with a second decoder to produce a second decoded sequence, and
producing a reconstructed image from the first decoded sequence and second decoded sequence with a reconstruction module.

13. The method of claim 12, wherein decoding the received first encoded sequence with the first decoder to produce the first decoded sequence includes counting, with a first counter a number of first reconstructed pixel values within the first decoded sequence produced by the first decoder, wherein the decoding is complete when the first counter counts the number of first reconstructed pixel values to be equal to a half of the MN pixel values of the acquired image.

14. The method of claim 13, wherein decoding the received second encoded sequence with the second decoder to produce the second decoded sequence includes counting, with a second counter a number of second reconstructed pixel values within the second decoded sequence produced by the second decoder, wherein the decoding is complete when the second counter counts the number of second reconstructed pixel values to be equal to a half of the MN pixel values of the acquired image.

15. The method of claim 14, wherein encoding includes entropy encoding the first sequence of P utilizing a first entropy encoder as the first encoder to produce the first encoded sequence and the flipped second sequence of P utilizing a second entropy encoder as the second encoder to produce the second encoded sequence.

16. The method of claim 15, wherein decoding includes entropy decoding utilizing a first entropy decoder as the first decoder and a second entropy as the second decoder.

17. The method of claim 15, wherein the entropy encoding and decoding includes Huffman coding.

18. The method of claim 17, wherein the first encoder utilizes a first Huffman coding and the second encoder utilizes a modified Huffman coding, wherein the modified Huffman coding includes reversing the order of the second encoded sequence to produce the flipped second encoded sequence.

19. The method of claim 18, wherein the first encoder and the second encoder utilize the same Huffman table.

20. The method of claim 19, wherein the first decoder and second decoder utilize the same Huffman table.

* * * * *